United States Patent
Choi et al.

(10) Patent No.: US 11,012,822 B2
(45) Date of Patent: May 18, 2021

(54) MULTI-ANTENNA SYSTEM, AND TRANSMITTING APPARATUS AND METHOD BASED ON INDEX CODING AND BEAMFORMING THEREOF

(71) Applicant: KOREA ADVANCED INSTITUTE OF SCIENCE AND TECHNOLOGY, Daejeon (KR)

(72) Inventors: Wan Choi, Daejeon (KR); Kyungrak Son, Daejeon (KR); Jung Hoon Lee, Seoul (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/553,906

(22) Filed: Aug. 28, 2019

(65) Prior Publication Data
US 2020/0314603 A1  Oct. 1, 2020

(30) Foreign Application Priority Data

Apr. 1, 2019 (KR) .................. 10-2019-0037747
Jul. 19, 2019 (KR) .................. 10-2019-0087459

(51) Int. Cl.
*H04W 4/08* (2009.01)
*H04W 72/00* (2009.01)
*H04W 72/08* (2009.01)
*H04B 7/06* (2006.01)
*H04L 12/18* (2006.01)

(52) U.S. Cl.
CPC ............ *H04W 4/08* (2013.01); *H04B 7/0617* (2013.01); *H04L 12/185* (2013.01); *H04W 72/005* (2013.01); *H04W 72/082* (2013.01)

(58) Field of Classification Search
CPC .... H04B 7/0617; H04W 4/08; H04W 72/005; H04W 72/082; H04L 12/185
See application file for complete search history.

(56) References Cited

U.S. PATENT DOCUMENTS 8,315,204 B2 * 11/2012 Zhu ................... H04B 7/0456
370/328
2005/0286663 A1 * 12/2005 Poon ................... H04B 7/0862
375/347

(Continued)

FOREIGN PATENT DOCUMENTS

KR    10-2017-0109210    9/2017

OTHER PUBLICATIONS

Zhou et al., Coordinated Multicell Multicast Beamforming Based on Manifold Optimization, Jul. 12, 2017, pp. 1-4.

(Continued)

*Primary Examiner* — Benjamin H Elliott, IV
(74) *Attorney, Agent, or Firm* — Lathrop GPM LLP (57) ABSTRACT

Disclosed are a multi-antenna system and a transmission and method based on index coding and beamforming thereof. A transmitter including a plurality of antennas may be configured to classify a plurality of receivers into at least one group, determine an index code for the group, design a beamforming matrix for the group, and transmit at least one of a plurality of files to the group through the antennas based on the index code and the beamforming matrix.

11 Claims, 9 Drawing Sheets

```
Algorithm 1 Proposed beamforming algorithm with the optimal index coding searching
 1: Initialize: Randomly choose 𝒮₁:K in all possible index code set 𝒫_d
 2: for all k = 1, ..., K do
 3:    Find effective channel matrix H_eff = [H_i∈𝒮₁, ..., H_j∈𝒮_K]
 4:    Calculate D_i as right singular matrix W of H_eff
 5:    Calculate M_i = I2DO(H_k, 𝒮_k)
 6:    calculate beamforming matrix w_i = D_i M_i
 7: end for
 8: Calculate SINR(𝒮₁:K) using (7).
 9: for all 𝒮'₁:K ∈ 𝒫_d do
10:    for all k = 1, ..., K do
11:       H_eff' = [H_i∈𝒮', ..., H_j∈𝒮'_K], D' = V(H_eff'), M_i' = I2DO(H_k, 𝒮'_k)
12:       w_i' = D_i' M_i'
13:    end for
14:    Calculate SINR(𝒮'₁:K) using (7)
15:    if SINR(𝒮₁:K) SINR(𝒮'₁:K) then
16:       𝒮₁:K = 𝒮'₁:K, w_i = w_i'
17:    end if
18: end for
19: Output: The optimal index code 𝒮₁:K and corresponding optimal beamforming matrix w_i, i = 1, ..., K.
```

(56) References Cited

U.S. PATENT DOCUMENTS

| | | | | |
|---|---|---|---|---|
| 2010/0179865 | A1* | 7/2010 | Lundqvist | G06Q 30/0241 |
| | | | | 705/14.4 |
| 2011/0002263 | A1* | 1/2011 | Zhu | H04L 25/03936 |
| | | | | 370/328 |
| 2012/0082198 | A1* | 4/2012 | Zhang | H04B 17/373 |
| | | | | 375/224 |
| 2014/0044069 | A1* | 2/2014 | Bao | H04B 7/0689 |
| | | | | 370/329 |
| 2015/0016379 | A1* | 1/2015 | Nam | H04B 7/0619 |
| | | | | 370/329 |
| 2020/0314603 | A1* | 10/2020 | Choi | H04B 7/0617 |

OTHER PUBLICATIONS

Demir, et al., Multi-Group Multicast Beamforming for Simultaneous Wireless Information and Power Transfer, 23rd European Signal Processing Conference (EUSIPCO), dated 2015, pp. 1356-1360.

* cited by examiner

| Algorithm 1 Proposed beamforming algorithm with the optimal index coding searching |
|---|
| 1: Initialize: Randomly choose $\mathcal{G}_{1:K}$ in all possible index code set $\mathcal{P}_d$ |
| 2: for all k = 1, ..., K do |
| 3:     Find effective channel matrix $H_{eff} = [H_{i \in \mathcal{G}_1}, ..., H_{j \in \mathcal{G}_K}]$ |
| 4:     Calculate $D_i$ as right singular matrix W of $H_{eff}$ |
| 5:     Calculate $M_i = $ I2DO$(H_k, \mathcal{G}_k)$ |
| 6:     calculate beamforming matrix $w_i = D_i M_i$ |
| 7: end for |
| 8: Calculate SINR($\mathcal{G}_{1:K}$) using (7). |
| 9: for all $\mathcal{G}'_{1:K} \in \mathcal{P}_d$ do |
| 10:     for all k = 1, ..., K do |
| 11:        $H_{eff}' = [H_{i \in \mathcal{G}_1}, ..., H_{j \in \mathcal{G}_K}]$, $D' = V(H_{eff}')$, $M_i' = $ I2DO$(H_k, \mathcal{G}_k)$ |
| 12:        $w_i' = D_i' M_i'$ |
| 13:     end for |
| 14:     Calculate SINR($\mathcal{G}'_{1:K}$) using (7) |
| 15:     if SINR($\mathcal{G}_{1:K}$) SINR($\mathcal{G}'_{1:K}$) then |
| 16:        $\mathcal{G}_{1:K} = \mathcal{G}'_{1:K}$, $w_i = w_i'$ |
| 17:     end if |
| 18: end for |
| 19: Output: The optimal index code $\mathcal{G}_{1:K}$ and corresponding optimal beamforming matrix $w_i$, i = 1, ..., K. |

MULTI-ANTENNA SYSTEM, AND TRANSMITTING APPARATUS AND METHOD BASED ON INDEX CODING AND BEAMFORMING THEREOF

CROSS REFERENCE TO RELATED APPLICATION

This application is based on and claims priority under 35 U.S.C. 119 to Korean Patent Application No. 10-2019-0037747, filed on Apr. 1, 2019, and 10-2019-0087459, filed on Jul. 19, 2019 in the Korean Intellectual Property Office, the disclosures of which is herein incorporated by reference in their entireties.

BACKGROUND OF THE INVENTION

1. Technical Field

Various embodiments relate to a multi-antenna system and a transmission and method based on index coding and beamforming thereof.

The invention was supported by Institute for Information and communications Technology Planning & Evaluation (IITP) grant funded by the Korea government (MSIT) (No. 2015-0-00820, a research on a novel communication system using storage as wireless communication resource).

2. Description of the Related Art

Radio data traffic is explosively increased due to text, voice messages, and video streaming during the past several years. It is expected that such a growing trend will further increase due to services, such as virtual reality, augmented reality, and hologram. Radio data traffic has unique characteristics, such as the preference of famous content and predictable demands, but a current radio communication system has increased its efficiency through additional radio communication resources without incorporating the unique characteristics. However, a method using the radio communication resources has reached its limit to some extent, and a new technology is necessary.

For this reason, in the 5G wireless communication system, a caching scheme for storing, by a user of a network, some data in a memory has emerged as a new technique. The caching scheme has been known to significantly reduce total network traffic. According to a known caching scheme, data transmission using a multicast method is provided if users (i.e., user equipments owned by users) request the same data, and data transmission using a unicast method is provided if users request different data.

SUMMARY OF THE INVENTION

However, a caching scheme, such as that described above, has a problem in that a long time is taken to transmit data using the unicast method. Accordingly, there is a need for a method capable of reducing the time taken to transmit data using the caching scheme.

According to various embodiments, an operating method of a transmitter may include classifying a plurality of receivers into at least one group, determining an index code for the group, designing a beamforming matrix for the group, and transmitting at least one of a plurality of files to the group through the antennas based on the index code and the beamforming matrix.

According to various embodiments, a transmitter may include a plurality of antennas, a processor connected to the antennas and configured to communicate with a plurality of receivers through the antennas, and a memory connected to the processor to store a plurality of files. According to various embodiments, the processor may be configured to classify a plurality of receivers into at least one group, determine an index code for the group, design a beamforming matrix for the group, and transmit at least one of a plurality of files to the group through the antennas based on the index code and the beamforming matrix.

According to various embodiments, a multi-antenna system may include a plurality of receivers, each receiver comprising a plurality of antennas and a transmitter configured to communicate with the receivers through the plurality of antennas. According to various embodiments, the transmitter may be configured to classify a plurality of receivers into at least one group, determine an index code for the group, design a beamforming matrix for the group, and transmit at least one of a plurality of files to the group based on the index code and the beamforming matrix.

DETAILED DESCRIPTION

Hereinafter, various embodiments of this document are described with reference to the accompanying drawings.

Figure 1:
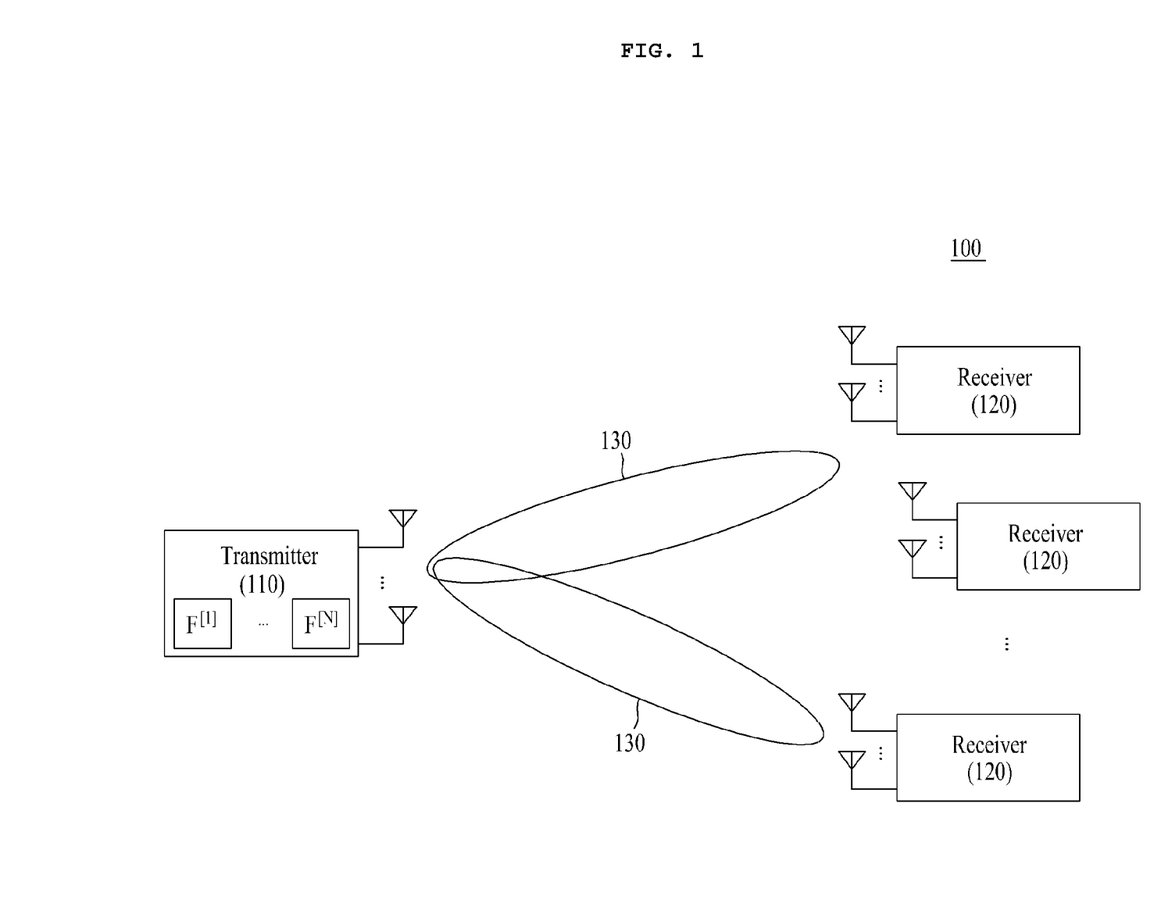
FIG. 1 is a diagram showing a multi-antenna system according to various embodiments.

FIG. 1 is a diagram showing a multi-antenna system 100 according to various embodiments.

Referring to FIG. 1, the multi-antenna system 100 according to various embodiments may include a transmitter 110 and a plurality of receivers 120, that is, K receivers 120.

The transmitter 110 may include a plurality of antennas, that is, $N_t$ antennas. Furthermore, the transmitter 110 may transmit a signal through the antennas. For example, the transmitter 110 may be a base station. The transmitter 110 may have stored a plurality of files, that is, N files ($\mathcal{L} \triangleq \{F^{[1]}, \ldots, F^{[N]}\}$).

Each receiver 120 may include a plurality of antennas, that is, $N_r$ antennas. Furthermore, the receiver 120 may receive a signal through the antennas. The receiver 120 may have stored at least any one of a plurality of files, that is, N files ($\mathcal{L} \triangleq \{F^{[1]}, \ldots, F^{[N]}\}$). The receiver 120 may request at least any one of a plurality of files, that is, N files ($\mathcal{L} \triangleq \{F^{[1]}, \ldots, F^{[N]}\}$), from the transmitter 110. In this case, the $k^{th}$ receiver 120 may have stored at least one file ($\mathbb{R} \subset \mathcal{L}$) in its internal memory, for example, a cache. Furthermore, a file $R_k \in \mathcal{L}$ requested by the $k^{th}$ receiver 120 may not have been stored in the memory ($R_k \not\in \mathbb{R}_k$).

In this case, the relation between a signal X transmitted by the transmitter 110 and a signal $y_k$ received by the $k^{th}$ receiver 120 may be represented like Equation 1. Total average power of the signal X transmitted by the transmitter 110 is P. The power restriction equation of the signal X transmitted by the transmitter 110 may be represented like Equation 2.

$$y_k = H_k^T X + z_k \qquad \text{[Equation 1]}$$

In this case, $H_k$ ($H_k \in \mathbb{C}^{N_r \times N_t}$) may indicate a channel value for the $k^{th}$ receiver 120. $Z_k$ may indicate standard complex Gaussian noise.

$$Tr(\mathbb{E}[XX^H]) \leq P \qquad \text{[Equation 2]}$$

According to various embodiments, the transmitter 110 may have stored information related to a plurality of receivers 120. For example, the information related to the receivers 120 may include at least any one of a channel value for each receiver 120 or the identifier of a file ($\mathbb{R}_k \subset \mathcal{L}$) stored in each receiver 120. According to various embodiments, the transmitter 110 may classify the receivers 120 into at least one group. According to an embodiment, the processor 340 of the transmitter 110 may classify the receivers 120 based on the information related to the receivers 110. In this case, the transmitter 110 may classify the receivers 120 based on the identifier of the file ($\mathbb{R}_k \subset \mathcal{L}$) stored in each receiver 120. According to another embodiment, the transmitter 110 may classify the receivers 120 based on a request received from the receivers 120.

According to various embodiments, the transmitter 110 may transmit at least any one of a plurality of files, that is, N files ($\mathcal{L} \triangleq \{F^{[1]}, \ldots, F^{[N]}\}$), to each group based on an index code ($\mathcal{G}$) for each group and a beamforming matrix ($w_i$). To this end, the transmitter 110 may determine the index code ($\mathcal{G}_i$) for each group. For example, the transmitter 110 has stored a plurality of index codes, that is, N index codes ($\mathcal{G}_1, \ldots \mathcal{G}_K \subset \{1, \ldots, K\}$), and may select any one of the index codes ($\mathcal{G}_1, \ldots \mathcal{G}_K \subset \{1, \ldots, K\}$) for each group. In this case, if the receivers 120 are classified into a plurality of groups, the transmitter 110 may determine index codes ($\mathcal{G}$) for all the groups ($\mathcal{G}_1 \cup \ldots \cup \mathcal{G}_K = \{1, \ldots, K\}$), and may determine different index codes ($\mathcal{G}_i$) so that the index codes do not overlap between the groups ($\mathcal{G}_i \cap \mathcal{G}_j = \phi$ for). In this case, the transmitter 110 may assign a group index indicator ($\mathcal{I}(\cdot)$) to each group as represented in Equation 3. Accordingly, the transmitter 110 may encode a message based on the index code ($\mathcal{G}_i$) of each group. Furthermore, the transmitter 110 may design a beamforming matrix ($w_i$) for each group, and may form an antenna beam 130 based on the beamforming matrix ($w_i$) using a plurality of antennas, that is, $N_t$ antennas. Furthermore, the transmitter 110 may transmit an encoded message through the antenna beam 130. In this case, a signal (X) transmitted from the transmitter 110 to each group may be represented like Equation 4.

$$\mathcal{I}(k) = i \longleftrightarrow k \in \mathcal{G}_i \qquad \text{[Equation 3]}$$

$$X \triangleq \sum_{i=1}^{K} w_i m_i \qquad \text{[Equation 4]}$$

In this case, $m_i$ may indicate the message to be transmitted to each group. $w_i$ ($w_i \in \mathbb{R}^{l_i \times N_t}$) may indicate the beamforming matrix for each group.

Figure 2A:
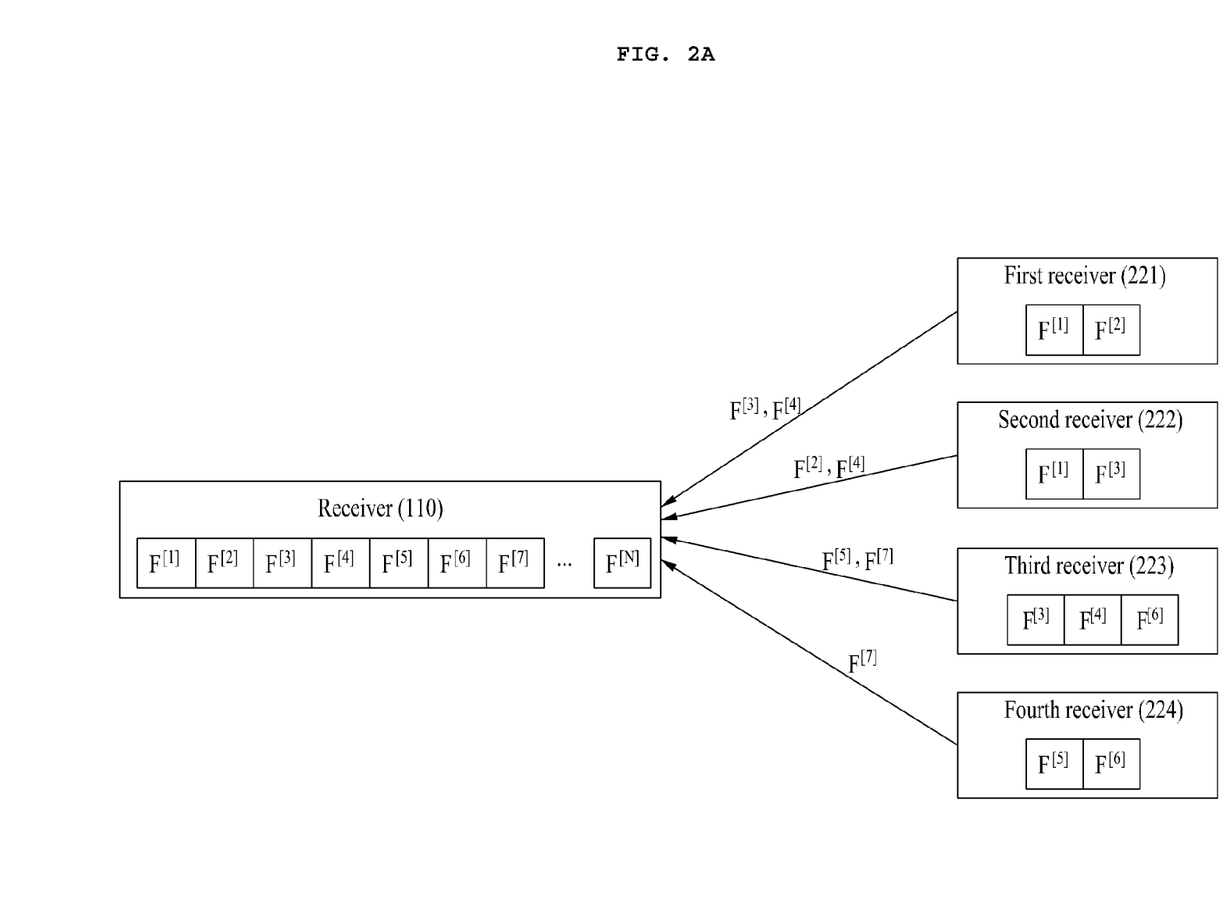
FIGS. 2A and 2B are diagrams for illustrating an operating method of the multi-antenna system according to various embodiments.
Figure 2B:
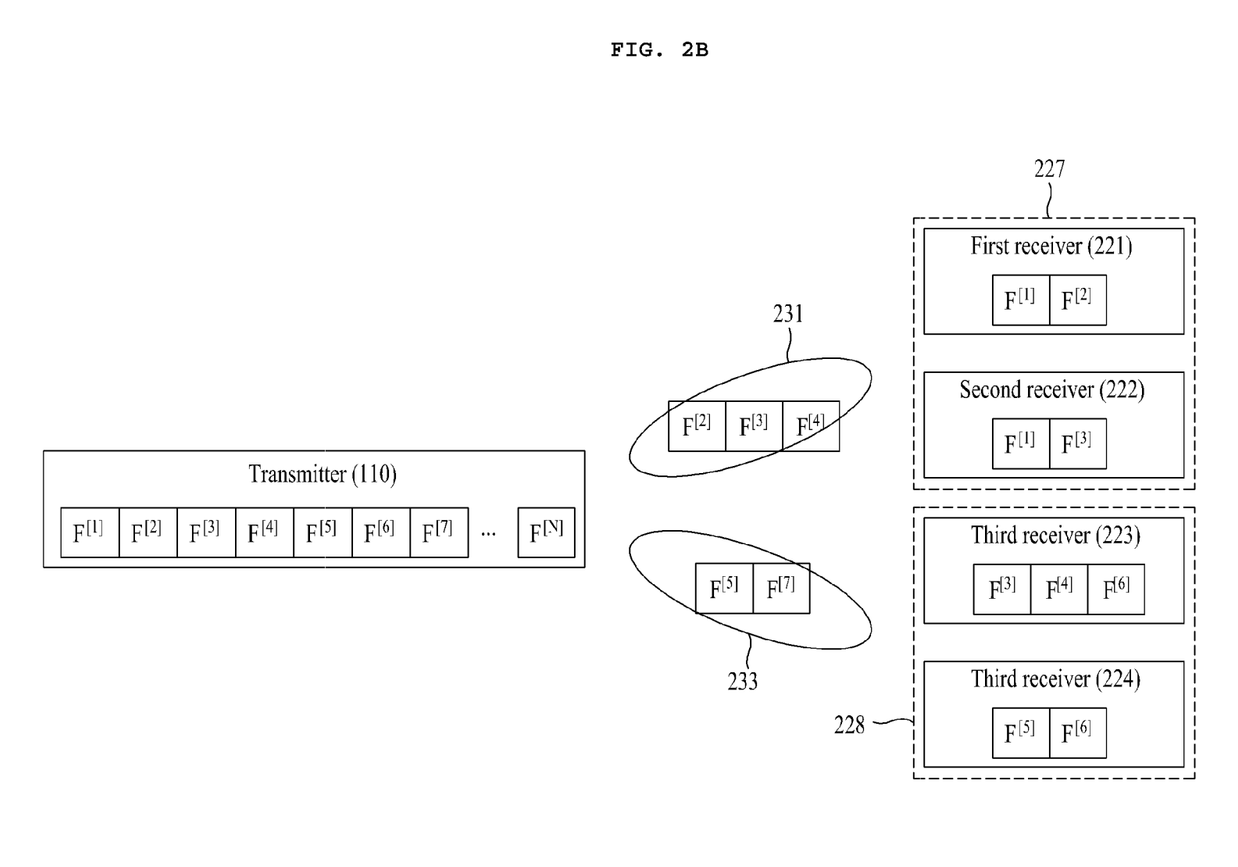

A signal ($y_k$) received by a $k^{th}$ receiver 120 may be expanded like Equation 5. Accordingly, the reception rate of the $k^{th}$ receiver 120 may be represented like Equation 6. In this case, the reception rate is related to $SINR_k$. $SINR_k$ indicates a signal to noise interference ratio and may be represented like Equation 7. A transmission time for each file ($\mathcal{L} \triangleq \{F^{[1]}, \ldots, F^{[N]}\}$) may be represented like Equation 8 because the $k^{th}$ receiver 120 receives at least any one of the files ($\mathcal{L} \triangleq \{F^{[1]}, \ldots, F^{[N]}\}$) from the transmitter 110. In this case, a substantial transmission time for at least some of the files ($\mathcal{L} \triangleq \{F^{[1]}, \ldots, F^{[N]}\}$) may be represented like Equation 9 because the transmitter 110 transmits at least some of the files ($\mathcal{L} \triangleq \{F^{[1]}, \ldots, F^{[N]}\}$) groups at the same time based on a plurality of index codes ($\mathcal{G}_i$) through a plurality of antennas. Accordingly, in order to minimize the substantial transmission time, a problem for determining the index symbol ($\mathcal{G}_i$) for each group and the beamforming matrix ($w^i$) may be represented like Equation 10. In this case, the problem for determining the index symbol ($\mathcal{G}_i$) for each group and the beamforming matrix ($w_i$) may be represented like Equation 11 because the substantial transmission time is a function of $SINR_k$.

$$y_k = H_k^T X + z_k \qquad \text{[Equation 5]}$$

$$= H_k^T \left( \sum_{i=1}^{K} w_i m_i \right) + z_k$$

$$= H_k^T w_{\mathcal{I}(k)} m_{\mathcal{I}(k)} + \left( \sum_{i \neq \mathcal{I}(k)} H_k^T w_i m_i \right) + z_k$$

$$R_k \triangleq \log \det(1 + SINR_k) \qquad \text{[Equation 6]}$$

$$SINR_k \triangleq \frac{\left| H_k^T w_{\mathcal{I}(k)} \right|^2}{\sum_{i \neq \mathcal{I}(k)} |H_k^T w_i|^2 + N_0} \qquad \text{[Equation 7]}$$

$$T_k \triangleq \frac{B}{R_k} \qquad \text{[Equation 8]}$$

$$T \triangleq \max_k T_k \qquad \text{[Equation 9]}$$

$$\underset{\substack{\{\mathcal{G}_1, \ldots, \mathcal{G}_K\} \\ \{w_1, \ldots, w_K\}}}{\text{minimize}} T \qquad \text{[Equation 10]}$$

subject to (2), $\mathcal{G}_1 \cup \ldots \cup \mathcal{G}_K = \{1, \ldots, K\}$, $\mathcal{G}_i \cap \mathcal{G}_j = \phi$ $$\underset{\substack{\{\mathcal{G}_1, \ldots, \mathcal{G}_K\} \\ \{w_1, \ldots, w_K\}}}{\text{maximize}} \min_k SINR_k \qquad \text{[Equation 11]}$$

subject to (2), $\mathcal{G}_1 \cup \ldots \cup \mathcal{G}_K = \{1, \ldots, K\}$, $\mathcal{G}_i \cap \mathcal{G}_j = \phi$ FIGS. 2A and 2B are diagrams for illustrating an operating method of the multi-antenna system 100 according to various embodiments.

Referring to FIG. 2A, the transmitter 110 may have stored a plurality of files, that is, N files ($\mathcal{L} \triangleq \{F^{[1]}, \ldots, F^{[N]}\}$), for example, $F^{[1]}, F^{[2]}, F^{[3]}, F^{[4]}, F^{[5]}, F^{[6]}, F^{[7]}, \ldots, F^{[N]}$. Each of a plurality of antennas, that is, K receivers 120 (221, 222, 223, and 224) may have stored at least any one of the files ($\mathcal{L} \triangleq \{F^{[1]}, \ldots, F^{[N]}\}$). For example, the first receiver 221 may have stored $F^{[1]}$ and $F^{[2]}$, the second receiver 222 may have stored $F^{[1]}$ and $F^{[3]}$, the third receiver 223 may have stored $F^{[3]}$, $F^{[4]}$ and $F^{[6]}$, and the fourth receiver 224 may have stored $F^{[5]}$ and $F^{[6]}$. The transmitter 110 may classify the receivers 120 into at least one group 227 and 228.

According to an embodiment, the transmitter 110 may classify the receivers 120 using information related to the receivers 120. To this end, the transmitter 110 may have stored the information related to the receivers 120. For example, the information related to the receivers 120 may include at least any one of a channel value for each receiver 120 or the identifier of a file ($\mathbb{R}_k \subset \mathcal{L}$) stored in each receiver 120. For example, the first receiver 221 and the second receiver 222 have stored $F^{[1]}$ in common, and the third receiver 223 and the fourth receiver 224 have stored $F^{[6]}$ in common. Accordingly, the transmitter 110 may group the first receiver 221 and the second receiver 222 into the first group 227, and may group the third receiver 223 and the fourth receiver 224 into the second group 228.

According to another embodiment, the transmitter 110 may classify the receivers 120 based on a request received from the receivers 120. To this end, each of the receivers 120 (221, 222, 223, and 224) may store at least one of the files ($\mathcal{L} \triangleq \{F^{[1]}, \ldots, F^{[N]}\}$), and may request at least another of the files ($\mathcal{L} \triangleq \{F^{[1]}, \ldots, F^{[N]}\}$) from the transmitter 110. For example, the first receiver 221 may request $F^{[3]}$ and $F_{[4]}$, the second receiver 222 may request $F^{[2]}$ and $F^{[4]}$, the third receiver 223 may request $F^{[5]}$ and $F^{[7]}$, and the fourth receiver 224 may request $F^{[7]}$. For example, the first receiver 221 and the second receiver 222 request $F^{[4]}$ in common, and the third receiver 223 and the fourth receiver 224 request $F^{[7]}$ in common. Accordingly, the transmitter 110 may group the first receiver 221 and the second receiver 222 into the first group 227, and may group the third receiver 223 and the fourth receiver 224 into the second group 228.

Referring to FIG. 2B, the transmitter 110 may transmit at least any one of a plurality of files, that is, N files ($\mathcal{L} \triangleq \{F^{[1]}, \ldots, F^{[N]}\}$), to each of the groups 227 and 228 using a plurality of antennas, that is, $N_t$ antennas. The transmitter 110 may transmit at least any one of the files ($\mathcal{L} \triangleq \{F^{[1]}, \ldots, F^{[N]}\}$) to each of the groups 227 and 228 based on an index code ($\mathcal{G}_i$) for each group 227, 228 and a beamforming matrix. According to an embodiment, the transmitter 110 may design the beamforming matrix through a two-stage scheme. The transmitter 110 may design a first beamforming matrix ($D_i$) for each group and a second beamforming matrix ($M_i$) for each receiver 120 within each group. Furthermore, the transmitter 110 may design a beamforming matrix ($w_i$) for each group based on the first beamforming matrix ($D_i$) and the second beamforming matrix ($M_i$). According to another embodiment, the transmitter 110 may design a beamforming matrix through a conjugate-gradient scheme. In an embodiment, the transmitter 110 may design the beamforming matrix based on the conjugate-gradient scheme using a designed beamforming matrix ($w_i$) as an initial beamforming matrix ($B_i$). Accordingly, the transmitter 110 may form antenna beams 231 and 233 corresponding to the groups 227 and 228 using a plurality of antennas, that is, $N_t$ antennas, and may transmit at least any one of the files ($\mathcal{L} \triangleq \{F^{[1]}, \ldots, F^{[N]}\}$) using each of the antenna beams 231 and 233. For example, the transmitter 110 may transmit $F^{[2]}$, $F^{[3]}$ and $F^{[4]}$, requested by the first receiver 221 and the second receiver 222, to the first group 227 through the first antenna beam 231, and may transmit $F^{[5]}$ and $F^{[7]}$, requested by the third receiver 223 and the fourth receiver 224, to the second group 228 through the second antenna beam 233.

According to various embodiments, each of the receivers 120 (221, 222, 223, and 224) may receive at least one of the files ($\mathcal{L} \triangleq \{F^{[1]}, \ldots, F^{[N]}\}$) from the transmitter 110. For example, in the first group 227, the first receiver 221 may receive $F^{[3]}$ and $F^{[4]}$ of $F^{[2]}$, $F^{[3]}$ and $F^{[4]}$ transmitted by the transmitter 110, and the second receiver 222 may receive $F^{[2]}$ and $F^{[4]}$ of $F^{[2]}$, $F^{[3]}$ and $F^{[4]}$ transmitted by the transmitter 110. Furthermore, in the second group 228, the third receiver 223 may receive both $F^{[5]}$ and $F^{[7]}$ transmitted by the transmitter 110, and the fourth receiver 224 may receive $F^{[7]}$ of $F^{[5]}$ and $F^{[7]}$ transmitted by the transmitter 110.

The multi-antenna system 100 according to various embodiments may include a plurality of receivers 120, each one having a plurality of antennas, and a transmitter 110 configured to communicate with the receivers 120 through a plurality of antennas.

According to various embodiments, the transmitter 110 may be configured to classify the receivers 120 into at least one group, determine an index code ($\mathcal{G}_i$) for the group, design a beamforming matrix for the group, and transmit at least any one of a plurality of files ($\mathcal{L} \triangleq \{F^{[1]}, \ldots, F^{[N]}\}$) to the group using the index code ($\mathcal{G}$) and the beamforming matrix.

According to various embodiments, the transmitter 110 may be configured to design a beamforming matrix by taking into consideration a group and each receiver 120 within the group.

According to an embodiment, the transmitter 110 may be configured to design a first beamforming matrix ($n_i$) for a group in order to prevent interference with the group, design a second beamforming matrix ($M_i$) for each receiver 120 within the group, and design a beamforming matrix ($w_i$) based on the first beamforming matrix ($D_i$) and the second beamforming matrix ($M_i$).

According to another embodiment, the transmitter 110 may be configured to design a first beamforming matrix ($D_i$) for a group in order to prevent interference with the group, design a second beamforming matrix ($M_i$) for each receiver 120 within the group, design an initial beamforming matrix ($w_i$) based on the first beamforming matrix ($D_i$) and the second beamforming matrix ($M_i$), and design a beamforming matrix based on a conjugate-gradient scheme using the initial beamforming matrix ($w_i$).

According to another embodiment, the conjugate-gradient scheme may be a scheme for updating a solution by calculating a gradient when an objective function is differentiable, but the solution of a closed form is not found.

According to another embodiment, the transmitter 110 may be configured to calculate the Riemannian gradient of an objective function by projecting the objective function based on an initial beamforming matrix ($w_i$) onto the tangent space of a manifold indicative of a power condition for a DT-RCG algorithm.

According to various embodiments, each receiver 120 within a group may be configured to receive at least any one of files ($\mathcal{L} \triangleq \{F^{[1]}, \ldots, F^{[N]}\}$) transmitted to the group.

According to various embodiments, the transmitter 110 may be configured to classify the receivers 120 using information previously stored in relation to the receivers 120.

According to various embodiments, at least any one of the receivers 120 previously stores at least any one of files ($\mathcal{L} \triangleq \{F^{[1]}, \ldots, F^{[N]}\}$). The information may include the identifiers of the files ($\mathcal{L} \triangleq \{F^{[1]}, \ldots, F^{[N]}\}$) stored with respect to each of the receivers 120.

Figure 3:
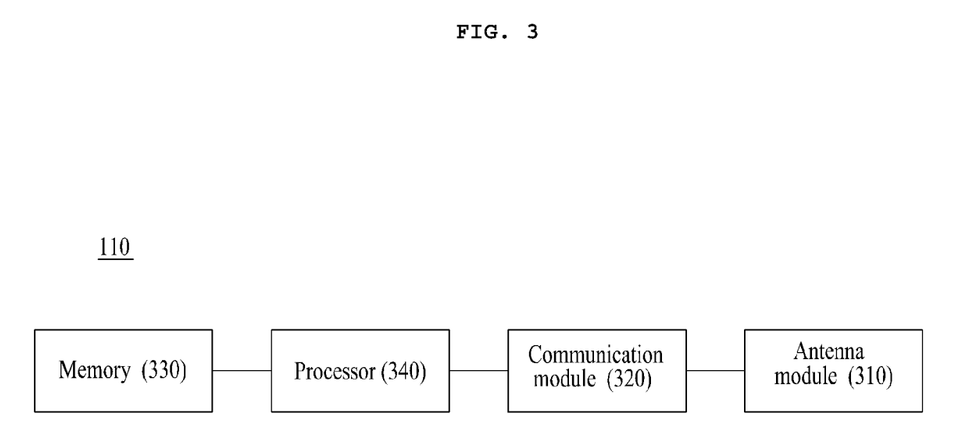
FIG. 3 is a diagram showing a transmitter according to various embodiments.

FIG. 3 is a diagram showing the transmitter 110 according to various embodiments.

Referring to FIG. 3, the transmitter 110 according to various embodiments may include at least any one of an antenna module 310, a communication module 320, a memory 330 or a processor 340.

The antenna module 310 is a multi-antenna module, and may include a plurality of antennas, that is, $N_t$ antennas. The antenna module 310 may transmit a signal to the outside or may receive a signal from the outside.

The communication module 320 may support the execution of communication of the transmitter 110. The communication module 320 may establish a communication channel for the transmitter 110 and perform communication through the communication channel. In this case, the communication module 320 may establish a communication channel between the transmitter 110 and the receivers 120.

The memory 330 may store various data used by at least one element of the transmitter 110. The data may include a program or input data or output data for a command related to the program. For example, the memory 330 may include at least any one of a volatile memory or a non-volatile memory. The memory 330 may have stored files ($\mathcal{L} \triangleq \{F^{[1]}, \ldots, F^{[N]}\}$) and information related to the receivers 120. In this case, the information related to the receivers 120 may include at least any one of a channel value for each receiver 120 or the identifier of a file ($\mathbb{R}_k \subset \mathcal{L}$) stored in each receiver 120. In this case, each receiver 120 may have stored at least any one of a plurality of files, that is, N files ($\mathcal{L} \triangleq \{F^{[1]}, \ldots, F^{[N]}\}$). In this case, the $k^{th}$ receiver 120 may have stored at least one file ($\mathbb{R}_k \subset \mathcal{L}$) in its internal memory, for example, a cache.

The processor 340 may control the elements of the transmitter 110 by executing a program of the memory 330, and may perform data processing or operation. The processor 340 may classify the receivers 120 into at least one group. Furthermore, the processor 340 may transmit at least any one of a plurality of files, that is, N files ($\mathcal{L} \triangleq \{F^{[1]}, \ldots, F^{[N]}\}$), to each of the groups 227 and 228. The processor 340 may transmit at least any one of the files ($\mathcal{L} \triangleq \{F^{[1]}, \ldots, F^{[N]}\}$) to each of the groups 227 and 228 based on an index code ($\mathcal{G}$) for each of the groups 227 and 228 and a beamforming ($w_i$).

The processor 340 may classify the receivers 120 into at least one group. According to an embodiment, the processor 340 may classify the receivers 120 based on information related to the receivers 120. For example, the processor 340 may classify the receivers 120 into at least one group based on a file ($\mathbb{R}_k \subset \mathcal{L}$) stored in each receiver 120. According to another embodiment, the processor 340 may classify the receivers 120 based on based on a request received from the receivers 120. For example, the processor 340 may classify the receivers 120 into at least one group based on a file ($R_k \in \mathbb{R}$) requested by each receiver 120. In this case, the file ($R_k \in \mathbb{R}$) requested by each receiver 120 may have not been stored in the memory ($R_k \notin \mathcal{L}_k$).

The processor 340 may transmit at least any one of files ($\mathbb{R} \triangleq \{F^{[1]}, \ldots, F^{[N]}\}$) to each group based on an index code ($\mathcal{G}$) for each group and a beamforming matrix. According to an embodiment, the processor 340 may design a beamforming matrix through a two-stage scheme. The processor 340 may design a first beamforming matrix ($D_i$) for each group and second beamforming matrix ($M_i$) for each receiver 120 within each group. Furthermore, the processor 340 may design a beamforming matrix ($w_i$) for each group based on the first beamforming matrix ($D_i$) and the second beamforming matrix ($M_i$). According to another embodiment, the processor 340 may design a beamforming matrix through a conjugate-gradient scheme. In an embodiment, the processor 340 may design the beamforming matrix based on the conjugate-gradient scheme using a designed beamforming matrix ($w_i$) as an initial beamforming matrix ($B_i$). Accordingly, the processor 340 may form an antenna beam 130 corresponding to each group using a plurality of antennas, that is, $N_t$ antennas, and may transmit at least any one of the files ($\mathbb{R} \triangleq \{F^{[1]}, \ldots, F^{[N]}\}$) through each antenna beam 130.

The transmitter 110 according to various embodiments may include a plurality of antennas, a processor 340 connected to the antennas and configured to perform communication with a plurality of receivers 120 through the antennas, and a memory 330 connected to the processor 340 to store a plurality of files ($\mathcal{L} \triangleq \{F^{[1]}, \ldots, F^{[N]}\}$).

According to various embodiments, the processor 340 may be configured to classify the receivers 120 into at least one group, determine an index code ($\mathcal{G}$) for the group, design a beamforming matrix for the group, and transmit at least any one of files ($\mathcal{L} \triangleq \{F^{[1]}, \ldots, F^{[N]}\}$) to the group through the antennas using the index code ($\mathcal{G}$) and the beamforming matrix.

According to various embodiments, the processor 340 may be configured to design a beamforming matrix by taking into consideration a group and each receiver 120 within the group.

According to an embodiment, the processor 340 may be configured to design a first beamforming matrix ($D_i$) for a group in order to prevent interference with the group, design a second beamforming matrix ($M_i$) for each receiver within the group, and design a beamforming matrix ($w_i$) based on the first beamforming matrix ($D_i$) and the second beamforming matrix ($M_i$).

According to another embodiment, the processor 340 may be configured to design a first beamforming matrix ($D_i$) for a group in order to prevent interference with the group, design a second beamforming matrix ($M_i$) for each receiver within the group, design an initial beamforming matrix ($w_i$) based on the first beamforming matrix ($D_i$) and the second beamforming matrix ($M_i$), and design a beamforming matrix through a conjugate-gradient scheme using the initial beamforming matrix ($w_i$).

According to another embodiment, the conjugate-gradient scheme may be a scheme for updating a solution by calculating a gradient when an objective function is differentiable, but the solution of a closed form is not found.

According to another embodiment, the processor 340 may be configured to calculate the Riemannian gradient of an objective function by projecting the objective function based on an initial beamforming matrix ($w_i$) onto the tangent space of a manifold indicative of a power condition for a DT-RCG algorithm.

According to various embodiments, the memory 330 may have further stored information related to receivers.

According to various embodiments, the processor 340 may be configured to classify the receivers 120 using information.

According to various embodiments, at least any one of the receivers 120 may have previously stored at least any one of files ($\mathcal{L} \triangleq \{F^{[1]}, \ldots, F^{[N]}\}$).

According to various embodiments, the information may include the identifier of the file ($\mathcal{L} \triangleq \{F^{[1]}, \ldots, F^{[N]}\}$) stored for each of the receivers 120.

According to various embodiments, the information may further store a channel value for each receiver 120.

According to various embodiments, the processor 340 may be configured to classify the receivers 120 based on a request received from the receivers 120.

Figure 4:
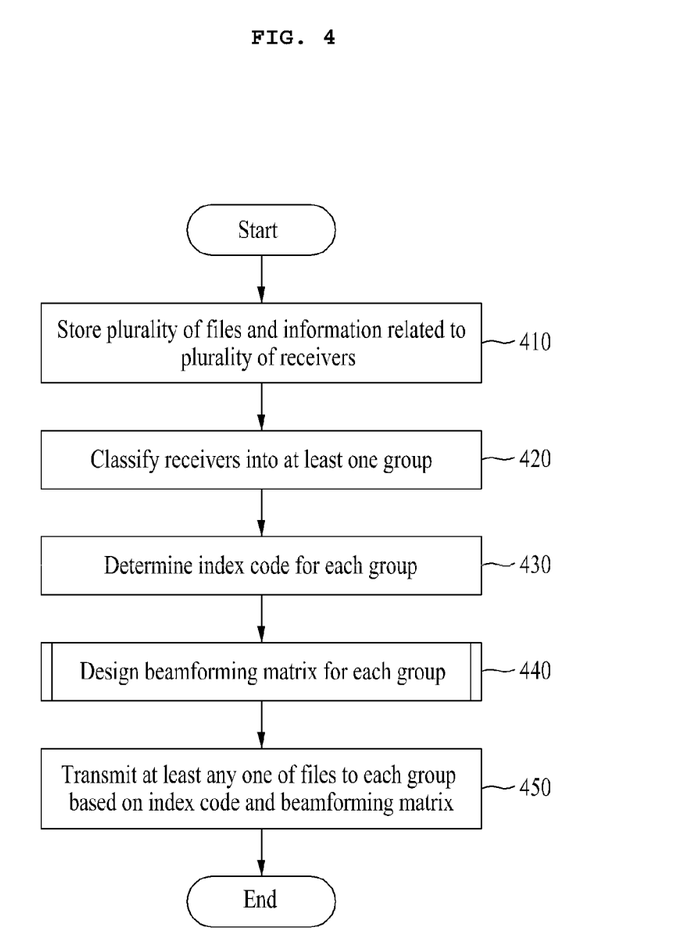
FIG. 4 is a diagram showing an operating method of the transmitter according to various embodiments.

FIG. 4 is a diagram showing an operating method of the transmitter 110 according to various embodiments.

Referring to FIG. 4, at operation 410, the transmitter 110 may have stored a plurality of files, that is, N files ($\mathcal{L} \triangleq \{F^{[1]}, \ldots, F^{[N]}\}$), and information related to a plurality of receivers 120. The memory 330 may have stored the files ($\mathcal{L} \triangleq \{F^{[1]}, \ldots, F^{[N]}\}$) and the information related to the receivers 120. In this case, the information related to the receivers 120 may include at least any one of a channel value for each receiver 120 or the identifier of a file ($\mathcal{G}_k \subset \mathcal{L}$) stored in each receiver 120.

At operation 420, the transmitter 110 may classify the receivers 120 into at least one group. In this case, each receiver 120 may have stored at least any one of a plurality of files, that is, N files ($\mathcal{L} \triangleq \{F^{[1]}, \ldots, F^{[N]}\}$). In this case, the $k^{th}$ receiver 120 may have stored at least one file ($\mathbb{R}_k \subset \mathcal{L}$) in its internal memory, for example, a cache.

According to an embodiment, the processor 340 may classify the receivers 120 based on information related to the receivers 120. For example, the processor 340 may classify the receivers 120 into at least one group based on a file ($\mathbb{R}_k \subset \mathcal{L}$) stored in each receiver 120.

According to another embodiment, the processor 340 may classify the receivers 120 based on a request received from the receivers 120. To this end, each receiver 120 may store at least one of the files ($\mathcal{L} \triangleq \{F^{[1]}, \ldots, F^{[N]}\}$), and may request at least another of the files ($\mathcal{L} \triangleq \{F^{[1]}, \ldots, F^{[N]}\}$) from the transmitter 110. For example, the processor 340 may classify the receivers 120 into at least one group based on a file ($\mathbb{R}_k \in \mathcal{L}$) requested by each receiver 120. In this case, the file ($\mathbb{R}_k \in \mathcal{L}$) requested by each receiver 120 may have not been stored in the memory ($\mathbb{R}_k \notin \mathbb{R}_k$).

At operation 430, the transmitter 110 may determine an index code ($\mathcal{G}_i$) for each group. To this end, the memory 330 may have stored a plurality of index codes, that is, N index codes ($\mathcal{G}_1, \ldots, \mathcal{G}_K \subset \{1, \ldots, K\}$). The processor 340 may select any one of the index codes ($\mathcal{G}_1, \ldots, \mathcal{G}_K \subset \{1, \ldots, K\}$) each group. In this case, if the receivers 120 are classified into a plurality of groups, the processor 340 may determine index codes ($\mathcal{G}_i$) for all the groups ($\mathcal{G}_1 \cup \ldots \cup \mathcal{G}_K = \{1, \ldots, K\}$), and may determine different index codes ($\mathcal{G}_i$) so that the index codes do not overlap between the groups ($\mathcal{G}_i \subset \mathcal{G}_j = \phi$ for).

At operation 440, the transmitter 110 may design a beamforming matrix for each group. The processor 340 may design the beamforming matrix by taking into consideration each group and each receiver 120 within a group. According to an embodiment, the transmitter 110 may design the beamforming matrix through a two-stage scheme. According to another embodiment, the transmitter 110 may design the beamforming matrix through a conjugate-gradient scheme.

Figure 5:
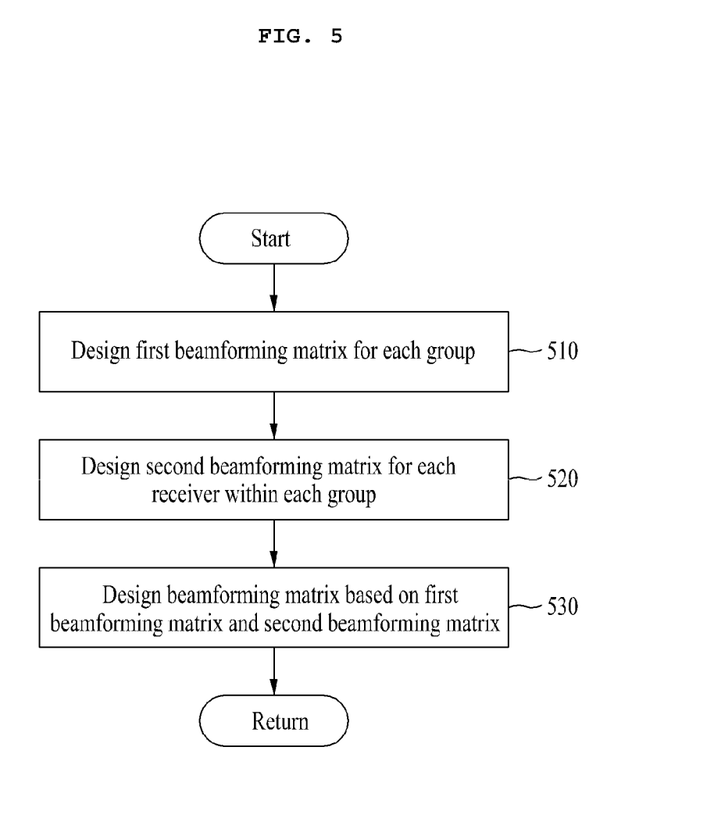
FIG. 5 is a diagram showing a beamforming matrix design operation of FIG. 4 according to an embodiment.
Figure 6:
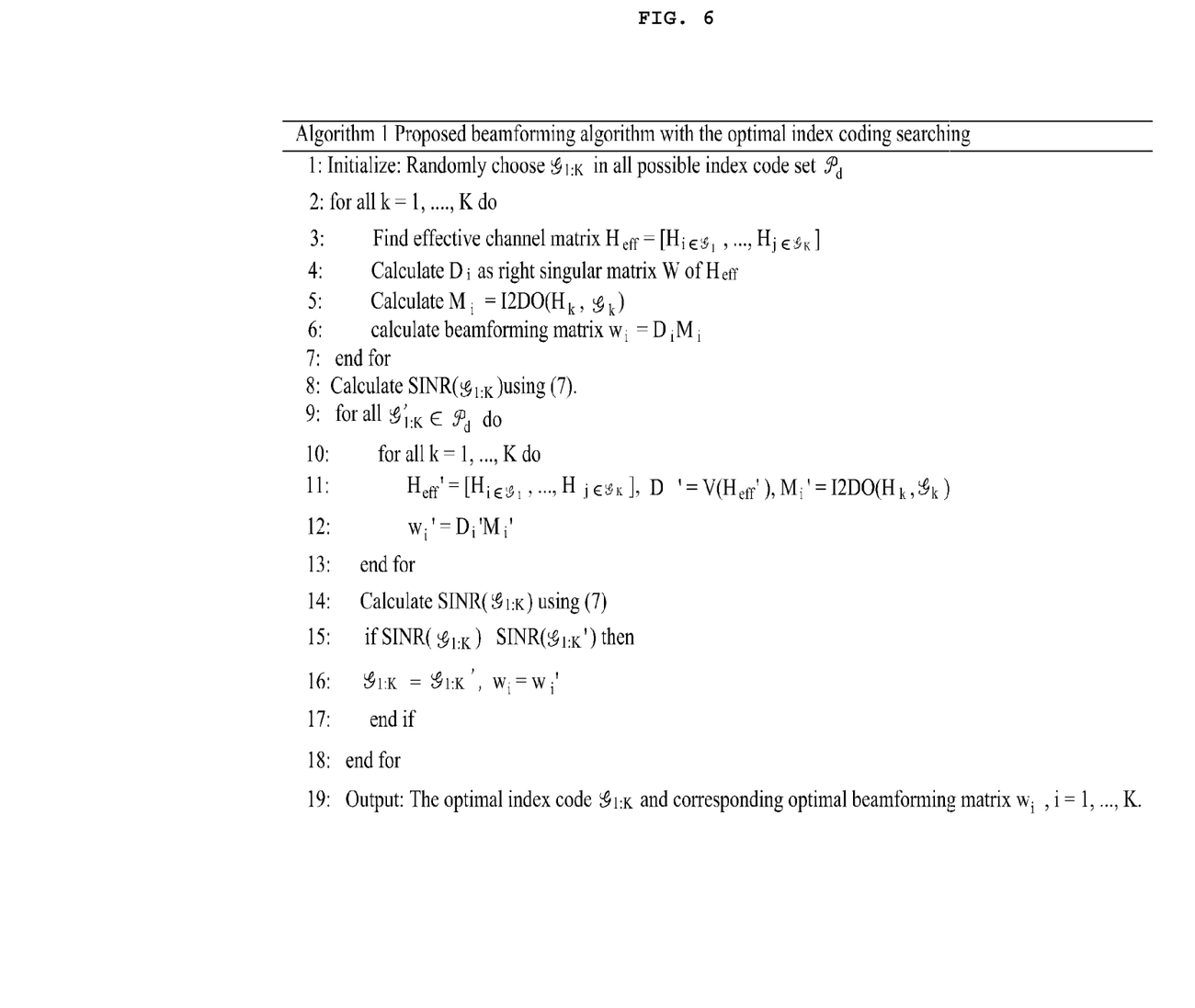
FIG. 6 is a diagram for illustrating a beamforming matrix design operation of FIG. 4 according to an embodiment.

FIG. 5 is a diagram showing a beamforming matrix design operation of FIG. 4 according to an embodiment. FIG. 6 is a diagram for illustrating a beamforming matrix design operation of FIG. 4 according to an embodiment.

Referring to FIG. 5, at operation 510, the transmitter 110 may design a first beamforming matrix ($D_i$) for each group. The transmitter 110 may design the first beamforming matrix ($D_i$) for each group for the purpose of multicast to all groups. The processor 340 may design the first beamforming matrix ($D_i$) for each group in order to prevent interference with each group. In this case, the processor 340 may design the first beamforming matrix ($D_i$) for each group so that interference between groups is removed by orthogonality. For example, the first beamforming matrix ($D_i$) may be a block diagonalization matrix. For example, the processor 340 may detect the null space of the remaining channel values in any one of groups, and may calculate part of the null space as a block diagonalization matrix.

At operation 520, the transmitter 110 may design a second beamforming matrix ($M_i$) for each receiver 120 within each group. The transmitter 110 may design the second beamforming matrix ($M_i$) for each receiver 120 within each group for the purpose of multicast to all the receivers 120 within each group. The processor 340 may design the second beamforming matrix ($M_i$) for each receiver 120 within each group so that reception performance of all the receivers 120 within each group becomes the same. For example, the second beamforming matrix ($M_i$) may be a multicast beamforming matrix. For example, the processor 340 may calculate the multicast beamforming matrix based on a channel value for a group and an index code ($\mathcal{G}$).

At operation 530, the transmitter 110 may design a beamforming matrix ($w_i$) for each group based on the first beamforming matrix ($D_i$) and the second beamforming matrix ($M_i$). The processor 340 may design the beamforming matrix ($w_i$) as the product of the first beamforming matrix ($D_i$) and the second beamforming matrix ($M_i$) as represented in Equation 12. Thereafter, the transmitter 110 may return to FIG. 4.

$$w_i = D_i M_i \quad \text{[Equation 12]}$$

According to an embodiment, the transmitter 110 may design the beamforming matrix ($w_i$) for each group based on an algorithm, such as that shown in FIG. 6. In this case, the processor 340 may determine an optimal index code ($\mathcal{G}_i$) and an optimal beamforming matrix ($w_i$) by performing a comparison on pieces of transmission performance based on all index codes ($\mathcal{G}_i$) in accordance with each group.

Figure 7:
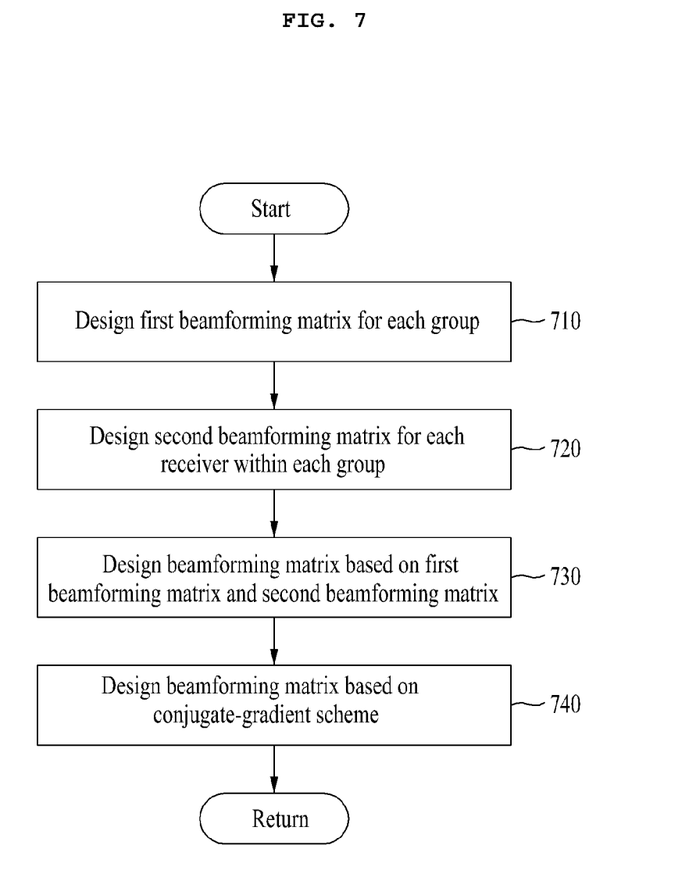
FIG. 7 is a diagram showing a beamforming matrix design operation of FIG. 4 according to another embodiment.

FIG. 7 is a diagram showing the operation of designing the beamforming matrix of FIG. 4 according to another embodiment.

Referring to FIG. 7, the transmitter 110 may design a first beamforming matrix ($D_i$) for each group at operation 710, and may design a second beamforming matrix ($M_i$) for each receiver 120 within each group at operation 720. Furthermore, at operation 730, the transmitter 110 may design a beamforming matrix ($w_i$) for each group based on the first beamforming matrix ($D_i$) and the second beamforming matrix ($M_k$). In this case, operation 710, operation 720 and operation 730 are similar to operation 510, operation 520 and operation 530, respectively, described with reference to FIG. 5 in the previous embodiment, and thus a detailed description thereof is omitted. At operation 730, the transmitter 110 may set the designed beamforming matrix ($w_i$) as an initial beamforming matrix ($B_i$) for a conjugate-gradient algorithm.

At operation 740, the transmitter 110 may design a beamforming matrix based on a conjugate-gradient scheme using the initial beamforming matrix. Thereafter, the transmitter 110 may return to FIG. 4.

The conjugate-gradient scheme will be described later.

Two types of NP-hard problems for finding an optimal beamforming matrix and an optimal index code may have been mixed in Equation 11. For this reason, a solution may be found through the conjugate-gradient scheme because the structure of the solution is complicated. The conjugate-gradient scheme is for calculating a gradient and continuously updating a solution when an objective function is differentiable, but it is difficult to find an optimal solution of a closed form. The setting of an initial point and a threshold may have an influence on performance. In this case, in order to apply the conjugate-gradient scheme, the following definitions may be used.

A determinant of the SINR may be represented like Equation 13. In Equation 13, an objective function is a fraction form. This is an equivalent parametric programming problem and may be converted like Equation 14.

$$\rho((B_1, \ldots, B_K)) \triangleq \min_K \det\left(\sum_{i=1}^{K} H_k^T B_i B_i^T H_k + N_0 I\right) \Big/ \det\left(\sum_{i=1, i \neq I(k)}^{K} H_k^T B_i B_i^T H_k + N_0 I\right)$$ [Equation 13]

In this case, $C_1 \triangleq \sum_{i=1}^{K} H_k^T B_i B_i^T H_k + N_0 I$ and $C_2 \triangleq \sum_{i=1, i \neq I(k)}^{K} H_k^T B_i B_i^T H_k + N_0 I$ may be defined.

$$\underset{\{B_1, \ldots, B_K\}}{\text{maximize}} \ F(\{B_i\}, t)$$ [Equation 14]

subject to (15).

In this case, $F(\{B_i\}, t) \triangleq \min_k f_k(\{B_i\}, t)$ and $f_k(\{B_i\}, t) \triangleq \det(C_2)$ may be given. Equation 14 may be represented like Equation 15 by approximating $$F(B, t, \mu) \triangleq \mu \log\left(\sum_k \exp(-f_k(\{B_i\}, t)/\mu)\right)$$

using a log-exp smoothing function because a given objective function is not differentiable.

$$\underset{\{B_1, \ldots, B_K\}}{\text{maximize}} \ F(B, t, \mu)$$ [Equation 15]

subject to (15).

Equation 15 may be calculated through a DT-RCG algorithm for calculating a gradient descent in a manifold. The manifold indicative of a power condition for the DT-RCG algorithm may be represented like Equation 16. Furthermore, the tangent space of the manifold represented like Equation 16 may be represented like Equation 17.

$$\mathcal{M} \triangleq \left\{(B_1, \ldots, B_K) \Big| \sum_{i=1}^{K} Tr(B_i B_i^H) \leq P\right\}$$ [Equation 16]

$$\mathcal{T}_\mathcal{M} \triangleq \left\{(T_1, \ldots, T_K) \Big| \sum_{i=1}^{K} Tr(B_i T_i^H) = 0\right\}$$ [Equation 17]

Accordingly, the Riemannian gradient of an objective function may be calculated like Equation 18 by projecting the Euclidean gradient $\nabla_B F(B)$ on to the tangent space of the manifold of the objective function. In this case, the $i^{th}$ component of $\nabla_B F(B)$ may be calculated like Equation 19 and Equation 20.

$$\text{grad}(F(B)) \triangleq \nabla_B F(B) - \frac{B_i}{P} \sum_{i=1}^{K} Tr(\nabla_B F(B)_i B_i^H)$$ [Equation 18]

$$\nabla_B F(B)_i \triangleq$$ [Equation 19]

$$\frac{\partial (F(B))}{\partial B_i} = \sum_k \frac{-\mu f_k(\{B_i\}, t)/\mu}{\sum_k \exp(-f_k(\{B_i\}, t))} \cdot \frac{\partial (f_k(\{B_i\}, t))}{\partial B_i}$$

$$\frac{\partial (f_k(\{B_i\}, t))}{\partial B_i} = \frac{\partial ((C_1) - t \cdot \det(C_2))}{\partial B_i} =$$ [Equation 20]

$$\begin{cases} \det(C_1)(H_k(C_1)^{-1} H_k^T + H_k^T(C_1)^{-1} H_k) B_i - \\ \quad \det(C_2)(H_k(C_2)^{-1} H_k^T + H_k^T(C_2)^{-1} H_k) B_i & i \in \mathcal{I}(k) \\ \det(C_1)(H_k(C_1)^{-1} H_k^T + H_k^T(C_1)^{-1} H_k) B_i & i \notin \mathcal{I}(k) \end{cases}$$

In such a conjugate-gradient scheme, how the initial beamforming matrix is set may affect performance. According to another embodiment, in order to efficiently obtain performance of a multi-antenna based on an index symbol, the beamforming matrix designed using the two-stage scheme according to the embodiment described with reference to FIG. 5 may be used as the initial beamforming matrix.

At operation 450, the transmitter 110 may transmit at least any one of files ($\mathcal{L} \triangleq \{F^{[1]}, \ldots, F^{[N]}\}$) to each group using the index code ($\mathcal{G}_i$) and the beamforming matrix. The processor 340 may encode at least any one of the files ($\mathcal{L} \triangleq \{F^{[1]}, \ldots, F^{[N]}\}$) based on the index code ($\mathcal{G}$) of each group. Furthermore, the processor 340 may form an antenna beam 130 based on the beamforming matrix for each group using a plurality of antennas, that is, $N_t$ antennas. According to an embodiment, the processor 340 may form the antenna beam 130 based on the beamforming matrix ($w_i$) designed according to the two-stage scheme. According to another embodiment, the processor 340 may form the antenna beam 130 based on a beamforming matrix designed according to a conjugate-gradient scheme. Accordingly, the processor 340 may transmit an encoded file ($\mathcal{L} \triangleq \{F^{[1]}, \ldots, F^{[N]}\}$) to each group through each antenna beam 130.

Figure 8:
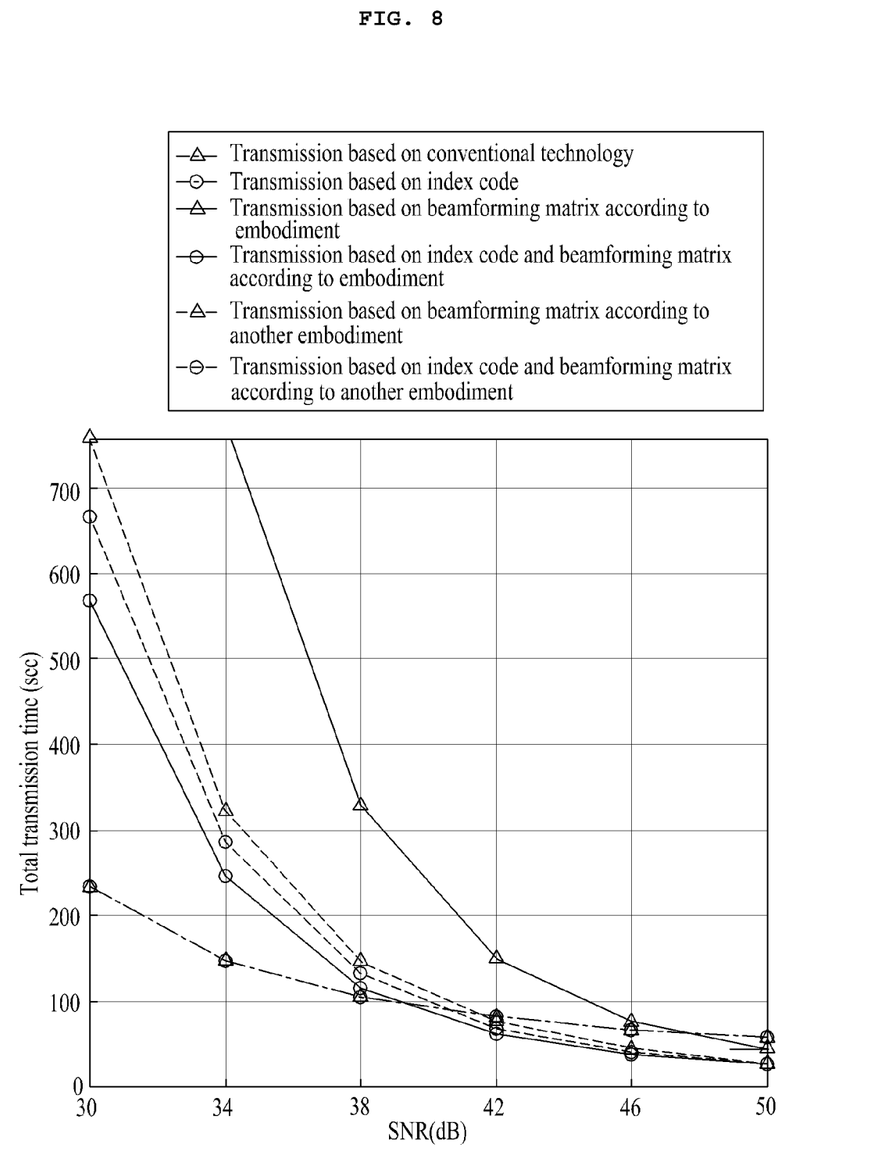
FIG. 8 is a diagram for illustrating performance of the transmitter according to various embodiments.

FIG. 8 is a diagram for illustrating performance of the transmitter 110 according to various embodiments. FIG. 8 shows simulation results for an average transmission time according to a channel environment in the environment in which the transmitter 110 has 30 antennas, each of the 7 receivers 120 has 40 antennas, and each file has the size of 100 bits.

Referring to FIG. 8, a transmission method according to various embodiments is based on an index code and a beamforming matrix. That is, the transmitter 110 according to various embodiments can provide multicast to all groups and provide multicast to all the receivers 120 within each group. A conventional transmission method may provide unicast based on a time division method. As the results of a comparison between the methods, performance of the transmission method according to various embodiments may be significantly different from that of the conventional transmission method. Furthermore, the transmission method according to various embodiments may have performance more enhanced than performance of a transmission method based on any one of an index code or a beamforming matrix. In an environment having a high SNR, the transmission method according to various embodiments may have enhanced performance compared to performance of a transmission method based on only any one of an index code or a beamforming matrix.

An operating method of the transmitter 110 according to various embodiments may include classifying a plurality of receivers 120 into at least one group, determining an index code ($\mathcal{G}_i$) for a group, designing a beamforming matrix for the group, and transmitting at least any one of a plurality of files ($\mathcal{L} \triangleq \{F^{[1]}, \ldots, F^{[N]}\}$) to the group through a plurality of antennas based on the index code ($\mathcal{G}_i$) and the beamforming matrix.

According to various embodiments, the designing of the beamforming matrix may include designing the beamforming matrix by taking into consideration the group and each receiver 120 within the group.

According to an embodiment, the designing of the beamforming matrix may include designing a first beamforming matrix ($D_i$) for the group in order to prevent interference with the group, designing the second beamforming matrix ($M_i$) for each receiver 120 within a group, and designing a beamforming matrix ($w_i$) based on the first beamforming matrix ($D_i$) and the second beamforming matrix ($M_i$).

According to another embodiment, the designing of the beamforming matrix may include designing a first beamforming matrix ($D_i$) for the group in order to prevent interference with the group, designing a second beamforming matrix ($M_i$) for each receiver 120 within the group, designing an initial beamforming matrix ($w_i$) based on the first beamforming matrix ($D_i$) and the second beamforming matrix ($M_i$), and designing a beamforming matrix based on a conjugate-gradient scheme based on the initial beamforming matrix ($w_i$).

According to another embodiment, the conjugate-gradient scheme may be a scheme for updating a solution by calculating a gradient when an objective function is differentiable, but the solution of a closed form is not found.

According to another embodiment, the designing of the beamforming matrix based on the conjugate-gradient scheme may include calculating the Riemannian gradient of an objective function by projecting the objective function based on the initial beamforming matrix ($w_i$) onto the tangent space of a manifold indicative of a power condition for a DT-RCG algorithm.

According to various embodiments, the classifying of the receivers 120 may include classifying the receivers 120 based on information previously stored in relation to the receivers 120.

According to various embodiments, at least any one of the receivers 120 may have previously stored at least any one of files ($\mathcal{L} \triangleq \{F^{[1]}, \ldots, F^{[N]}\}$).

According to various embodiments, the information may include the identifier of the file ($\mathcal{L} \triangleq \{F^{[1]}, \ldots, F^{[N]}\}$) stored for each of the receiver 120.

According to various embodiments, the information may further include a channel value for each of the receivers 120.

According to various embodiments, the classifying of the receivers 120 may include classifying the receivers 120 based on a request received from the receivers 120.

According to various embodiments, network traffic within the multi-antenna system 100 can be reduced by introducing the caching scheme into the multi-antenna system 100. In this case, when the transmitter 110 implements the caching scheme, it may transmit a file to a plurality of receivers 120 based on index coding and beamforming. To this end, the transmitter 110 may classify the plurality of receivers 120 into a plurality of groups. Furthermore, the transmitter 110 may group data for the receivers 120 within each group based on index coding, and may transmit the data. Furthermore, the transmitter 110 may transmit the data to all the groups based on beamforming at the same time. Accordingly, the time taken for the transmitter 110 to transmit a file to a plurality of receivers 120 can be reduced. Furthermore, the transmitter 110 may perform beamforming so that all the receivers 120 can effectively receive data for each receiver 120. Accordingly, data reception performance of the receivers 120 can be enhanced.

The embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in this document includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

Various embodiments of this document may be implemented as software including one or more commands stored in a storage medium (e.g., the memory 330) readable by a machine (e.g., the transmitter 110). For example, the processor (e.g., the processor 340) of the machine may fetch at least one of one or more stored commands from the storage medium, and may execute the command. This enables the machine to execute at least one function based on the fetched at least one command. The one or more commands may include code generated by a compiler or code executable by an interpreter. The storage medium readable by the machine may be provided in the form of a non-transitory storage medium. In this case, "non-transitory" means that the storage medium is a tangible device and does not include a signal (e.g., electromagnetic waves), and is not limited to whether data is stored in the storage media semi-permanently or temporally.

According to various embodiments, each of elements (e.g., module or program) may include a single entity or a plurality of entities. According to various embodiments, one or more of the above-described elements or operations may be omitted or one or more other elements or operations may be added. Alternatively or additionally, a plurality of elements (e.g., modules or programs) may be integrated into a single element. In such a case, the integrated element may perform one or more functions of each of the plurality of elements identically or similarly to a function performed by a corresponding element of the plurality of elements before they are integrated. According to various embodiments, operations performed by a module, a program or other elements may be executed sequentially, in parallel, repeatedly, or heuristically, or one or more of the operations may be executed in different order or may be omitted, or one or more operations may be added.

According to various embodiments, network traffic within a multi-antenna system can be reduced by introducing a caching scheme into the multi-antenna system. In this case, when a transmitter implements the caching scheme, it may transmit a file to a plurality of receivers based on index coding and beamforming. To this end, the transmitter may classify the plurality of receivers into a plurality of groups. Furthermore, the transmitter may group data for receivers within each group based on index coding, and may transmit the data. Furthermore, the transmitter may transmit data to all the groups at the same time based on beamforming. Accordingly, the time taken for the transmitter to transmit a file to the plurality of receivers can be reduced. Furthermore, the transmitter may perform beamforming so that all the receivers can effectively receive data for each receiver. Accordingly, data reception performance of the receiver can be enhanced.

What is claimed is:

1. An operating method of a transmitter having a plurality of antennas, the method comprising:
   classifying a plurality of receivers into at least one group;
   determining an index code for the group;
   designing a beamforming matrix for the group; and
   transmitting at least one of a plurality of files to the group through the antennas based on the index code and the beamforming matrix,
   wherein the designing of the beamforming matrix comprises:
   designing a first beamforming matrix for the group in order to prevent interference with the group;
   designing a second beamforming matrix for each receiver within the group;
   designing an initial beamforming matrix based on the first beamforming matrix and the second beamforming matrix; and
   designing the beamforming matrix based on a conjugate-gradient scheme using the initial beamforming matrix.

2. The method of claim 1, wherein the conjugate-gradient scheme comprises a scheme for updating a solution by calculating a gradient when an objective function is differentiable, but the solution of a closed form is not found.

3. The method of claim 1, wherein the designing of the beamforming matrix based on the conjugate-gradient scheme comprises:
   calculating a Riemannian gradient of an objective function by projecting the objective function based on the initial beamforming matrix onto a tangent space of a manifold indicative of a power condition for a DT-RCG algorithm.

4. The method of claim 1, wherein the classifying of the plurality of receivers comprises:
   classifying the receivers based on information previously stored in relation to the receivers,
   wherein at least one of the receivers previously stores at least one of the files, and
   wherein the information comprises at least one of an identifier of the stored file or a channel value for each of the receivers with respect to each of the receivers.

5. A transmitter, comprising:
   a plurality of antennas;
   a processor connected to the antennas and configured to communicate with a plurality of receivers through the antennas; and
   a memory connected to the processor to store a plurality of files,
   wherein the processor is configured to:
   classify a plurality of receivers into at least one group,
   determine an index code for the group,
   design a beamforming matrix for the group, and
   transmit at least one of a plurality of files to the group through the antennas based on the index code and the beamforming matrix,
   wherein the processor is configured to:
   design a first beamforming matrix for the group in order to prevent interference with the group,
   design a second beamforming matrix for each receiver within the group,
   design an initial beamforming matrix based on the first beamforming matrix and the second beamforming matrix, and
   design the beamforming matrix based on a conjugate-gradient scheme using the initial beamforming matrix.

6. The transmitter of claim 5, wherein the conjugate-gradient scheme comprises a scheme for updating a solution by calculating a gradient when an objective function is differentiable, but the solution of a closed form is not found.

7. The transmitter of claim 5, wherein the processor is configured to calculate a Riemannian gradient of an objective function by projecting the objective function based on the initial beamforming matrix onto a tangent space of a manifold indicative of a power condition for a DT-RCG algorithm.

8. The transmitter of claim 5,
   wherein the memory further stores information related to the receivers, and
   wherein the processor is configured to classify the receivers based on the information,
   wherein at least one of the receivers previously stores at least one of the files, and
   wherein the information comprises at least one of an identifier of the stored file or a channel value for each of the receivers with respect to each of the receivers.

9. A multi-antenna system, comprising:
   a plurality of receivers, each receiver comprising a plurality of antennas; and
   a transmitter configured to communicate with the receivers through the plurality of antennas,
   wherein the transmitter is configured to:
   classify a plurality of receivers into at least one group;
   determine an index code for the group;
   design a beamforming matrix for the group; and
   transmit at least one of a plurality of files to the group based on the index code and the beamforming matrix,
   wherein the transmitter is further configured to:
   design a first beamforming matrix for the group in order to prevent interference with the group;
   design a second beamforming matrix for each receiver within the group;
   design an initial beamforming matrix based on the first beamforming matrix and the second beamforming matrix; and design the beamforming matrix based on a conjugate-gradient scheme using the initial beamforming matrix.

10. The multi-antenna system of claim 9, wherein the conjugate-gradient scheme comprises a scheme for updating a solution by calculating a gradient when an objective function is differentiable, but the solution of a closed form is not found.

11. The multi-antenna system of claim 9, wherein the transmitter is configured to calculate a Riemannian gradient of an objective function by projecting the objective function based on the initial beamforming matrix onto a tangent space of a manifold indicative of a power condition for a DT-RCG algorithm.

* * * * *